United States Patent
Haupt et al.

(12) 
(10) Patent No.: US 6,318,815 B1
(45) Date of Patent: Nov. 20, 2001

(54) BRAKING FORCE BOOSTING DEVICE, IN PARTICULAR FOR AUTOMOTIVE VEHICLES

(75) Inventors: Karlheinz Haupt, Gau-Algesheim; Hans Jörg Feigel, Rosbach; Horst Krämer, Ginsheim-Gustavsburg, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/601,048
(22) PCT Filed: Jan. 26, 1999
(86) PCT No.: PCT/EP99/00449
  § 371 Date: Oct. 13, 2000
  § 102(e) Date: Oct. 13, 2000
(87) PCT Pub. No.: WO99/38741
  PCT Pub. Date: Aug. 5, 1999

(30) Foreign Application Priority Data

Jan. 31, 1998 (DE) ............................................. 198 03 821

(51) Int. Cl.$^7$ .............................. B60T 8/44; B60T 13/10; B60T 13/52
(52) U.S. Cl. .................................. 303/113.4; 188/DIG. 1; 188/358; 303/114.3; 303/166; 303/DIG. 4
(58) Field of Search ........................... 303/114.3, 113.4, 303/113.1, 155, DIG. 3, DIG. 4, 166, 114.1, 199; 188/DIG. 1, 355–359; 60/547.1; 91/369.1, 369.2; 701/70, 78, 79, 80, 71

(56) References Cited

U.S. PATENT DOCUMENTS

| 5,779,329 | * | 7/1998 | Takeshima et al. | ............... 303/113.4 |
| 6,019,440 | * | 2/2000 | Scherer et al. | ................... 303/114.3 |

FOREIGN PATENT DOCUMENTS

| 195 01 760 | 7/1996 | (DE) . |
| 196 44 880 | 4/1998 | (DE) . |
| 0 754 607 | 1/1997 | (EP) . |
| 0 800 975 | 10/1997 | (EP) . |
| 0 827 887 | 3/1998 | (EP) . |
| 0 850 815 | 7/1998 | (EP) . |
| 9717240 | * 5/1997 | (WO) . |
| 98 00321 | 1/1998 | (WO) . |

* cited by examiner

*Primary Examiner*—Douglas C. Butler
(74) *Attorney, Agent, or Firm*—Rader, Fishman & Grauer PLLC

(57) ABSTRACT

A braking pressure boosting device is suggested, in particular for automotive vehicles, which includes a boost sensor for sensing or identifying the point of maximum boosting of the braking pressure boosting device. By using the boost sensor, ad signal is generated reporting the point of maximum boosting. This invention permits the manufacture of high-performance braking force boosting devices requiring minimal space and opens up new potential for economizing.

6 Claims, 2 Drawing Sheets

BRAKING FORCE BOOSTING DEVICE, IN PARTICULAR FOR AUTOMOTIVE VEHICLES

TECHNICAL FIELD

This invention generally relates to vehicle brake systems, and more particularly relates to a braking force boosting device, in particular for automotive vehicles.

BACKGROUND OF THE INVENTION

Such braking force boosting devices are basically known and in use. DE 196 44 880 C1, for instance, follows the principle of permanently supervising the operation of a pneumatic brake booster by comparing it with the pedal force (driver's intention) and of providing an auxiliary energy source in case the required performance is not rendered. The brake system thus features a redundant design.

A disadvantage of the known brake boosters is that only limited boosting energy is available. In principle, the characteristic line of the input-force-to-output-force ratio of a brake booster is linear. The gradient of the characteristic line corresponds to the design-implied boosting factor available. With the maximum pressure difference having been established between working chamber and vacuum chamber, there prevails a condition of maximum boosting, i.e., any further increase in the output force is possible only by means of an additionally applied pedal force.

As the assembly space in the vehicle is very limited it is not feasible to just increase the dimensions of a pneumatic braking force boosting device in order to achieve a greater performance. On the other hand, however, the driving performances of motor vehicles are permanently on the upward move, thus requiring more powerful high-performance brake systems. Ultimately, in any new product it is highly desirable to economize and save cost. In view of this aspect, redundant-design brake systems are not feasible.

It is an object of the present invention to provide a small-dimension, light-weight braking force boosting device which matches the increased performance requirements within the overall life-time of a vehicle and which, at the same time, provides new potential for economizing.

This task is solved by the present invention wherein means are provided for sensing or identifying the point of maximum boosting of the braking force boosting device and in that a signal can be generated which reports the point of maximum boosting. In principle, these means may be based on different principles. In accordance with this invention, a first solution provides to determine a pressure difference or a pressure gradient between a chamber of variable pressure and the atmosphere. This solution makes use of the fact that, in principle, the pressure of a working chamber of a pneumatic brake booster gradually approaches the ambient air pressure in case of ventilation (i.e., in case of a braking operation). As soon as no pressure difference is to be noticed or the pressure gradient is zero, a signal reporting the point of maximum boosting is generated which can be used for connecting up or making available additional boosting means. This enables appropriate counter measures such as supplementing the brake booster with a hydraulic pressure increase which preferably is to be generated by an ABS unit with a hydraulic pump. This procedure is beneficial in that the brake booster can deliberately be constructed with less performance so that it will be sufficient for, e.g., 90% of all braking operations within the life-time of a vehicle. On the contrary, the particularly high performance needed for the remaining 10% of all braking operations, especially for so-called panic braking operations using the highest braking force, will be generated by the other boosting energy source. A further advantage of this invention is that a control of the pressure increase generated by the hydraulic pump also can bring about a control of the additionally applied boosting energy. In other words, it is thus made possible to adapt the variation of the characteristic line more flexibly to the needs of comfort or safety than is possible by means of the known systems.

Another solution, a solution responsive to the difference in travel, provides a means, e.g., in the form of a switch, for sensing or identifying a distance between the valve piston and the control housing. In case of a distance corresponding to the point of maximum boosting, this means provides an operating or actuating signal, in particular for connecting up additional boosting means.

Preferably, a switch is used by means of which an operating signal can be emitted so that a circuit is closed or opened. As an alternative thereto, it is conceivable to provide a sensor, e.g., a Hall sensor emitting a corresponding sensor signal.

According to a further development of this invention, the valve piston abuts on a stop, disposed within the control housing, when the point of maximum boosting has been reached so that there is no distance between the valve piston and the control housing. The means detects the non-existing distance and emits a signal indicative of the point of maximum boosting.

It is understood that this invention cannot be used for a changed rating of a pneumatic brake booster, only. It is likewise conceivable to compensate any defects or failures of a conventional brake booster by means of the described device without leaving the grounds of this invention.

DETAILED DESCRIPTION OF THE PREFERRED EMBODIMENTS

Figure 1:
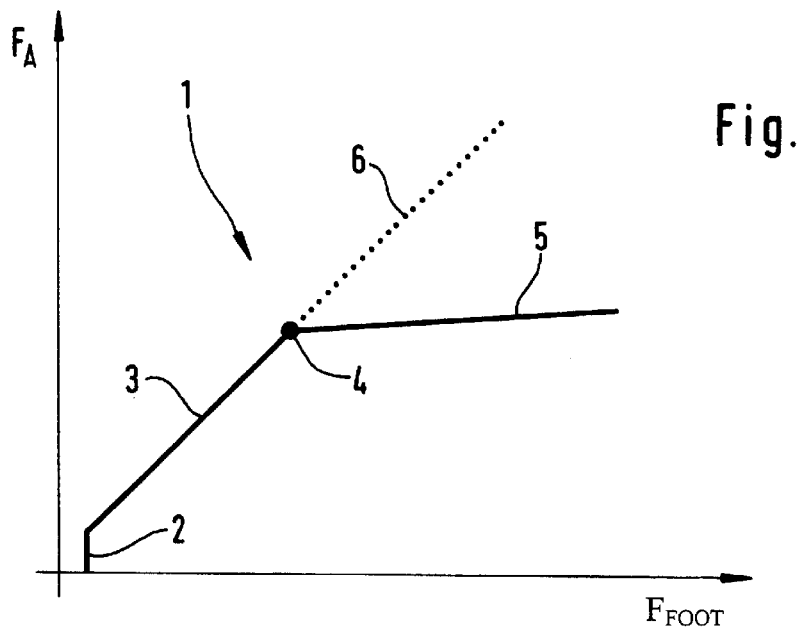
FIG. 1 is the characteristic line of a braking force boosting device.

The fundamental mode of operation of a brake booster is illustrated in FIG. 1. FIG. 1 shows a characteristic line 1 of a braking force boosting device, with the boosting energy $F_A$ (output force) being traced as a function of the force applied by the foot $F_{FOOT}$ (input force). A first branch 2 of characteristic line 1, starting from the point of zero, features a so-called jumper, i.e., a quasi abrupt response of the brake booster in case of a certain input force. This branch 2 is followed by the service brake range 3 with the device-specifically determined boosting factor (gradient of the characteristic line). The service brake range 3 is terminated by the point of maximum boosting 4. The normal service brake range 3 is regularly followed by a reduced-gradient branch 5. In conventional brake boosters, this branch 5 is characterized by an increase in the force of the foot, i.e., only due to the additionally applied force of the foot. The gradient in this instance is 1:1, i.e., one additional increment in the force of the foot generates exactly one additional increment in the output force. This invention allows to provide an additional boosting energy source after the point of maximum boosting 4 has been passed and to connect it up, controlled, or even to control the additionally applied boosting energy. Consequently, it is also possible to generate a so-called brake-assist function with a very abrupt increase in the force (steep characteristic line). The action of the additionally applied boosting energy is exemplarily illustrated by the dotted-line branch 6 in FIG. 1.

A pneumatic braking force boosting device 7 fundamentally comprises a housing made of two bowl-type halves and at least including two chambers separated from each other by a movable wall. One of the chambers is a constant-pressure chamber and permanently under a vacuum whereas the other chamber is likewise under vacuum while not being actuated. However, within the scope of actuation, this chamber can be ventilated in a controlled manner with ambient air under ambient pressure by means of a control valve, disposed within a control housing. In the condition of maximum boosting, the pressure in this so-called working chamber corresponds to the pressure of the ambient atmosphere. Moreover, the braking force boosting device 7 includes an input member 8, which can be applied by the force of the foot and is provided with a valve piston of the control valve, and an output member 9 applying a master brake cylinder with the boosting energy. The maximum boosting energy of the pneumatic braking force boosting device is decisively determined by the pressure difference achievable at the maximum between the two chambers.

The braking force boosting device 7 is provided with a means 10 for identifying the point of maximum boosting 4 by means of which a signal can be generated which reports the point of maximum boosting 4.

Various constructions are conceivable for means 10. In one variant of this invention, means 10 senses a pressure difference between the variable-pressure chamber (working chamber) and the ambient air pressure. From this information, it generates a signal reporting the point of maximum boosting when there is a maximum pressure difference. In principle, it is possible to also use this procedure with the pressure gradient variation in the working chamber so that the time derivative of the pressure in the working chamber is set to be zero as a criterion of the point of maximum boosting 4. In this case, pressure sensors present themselves as means 10. These pressure sensors are preferably arranged in the area of the control valve or even thereon.

Figure 2:
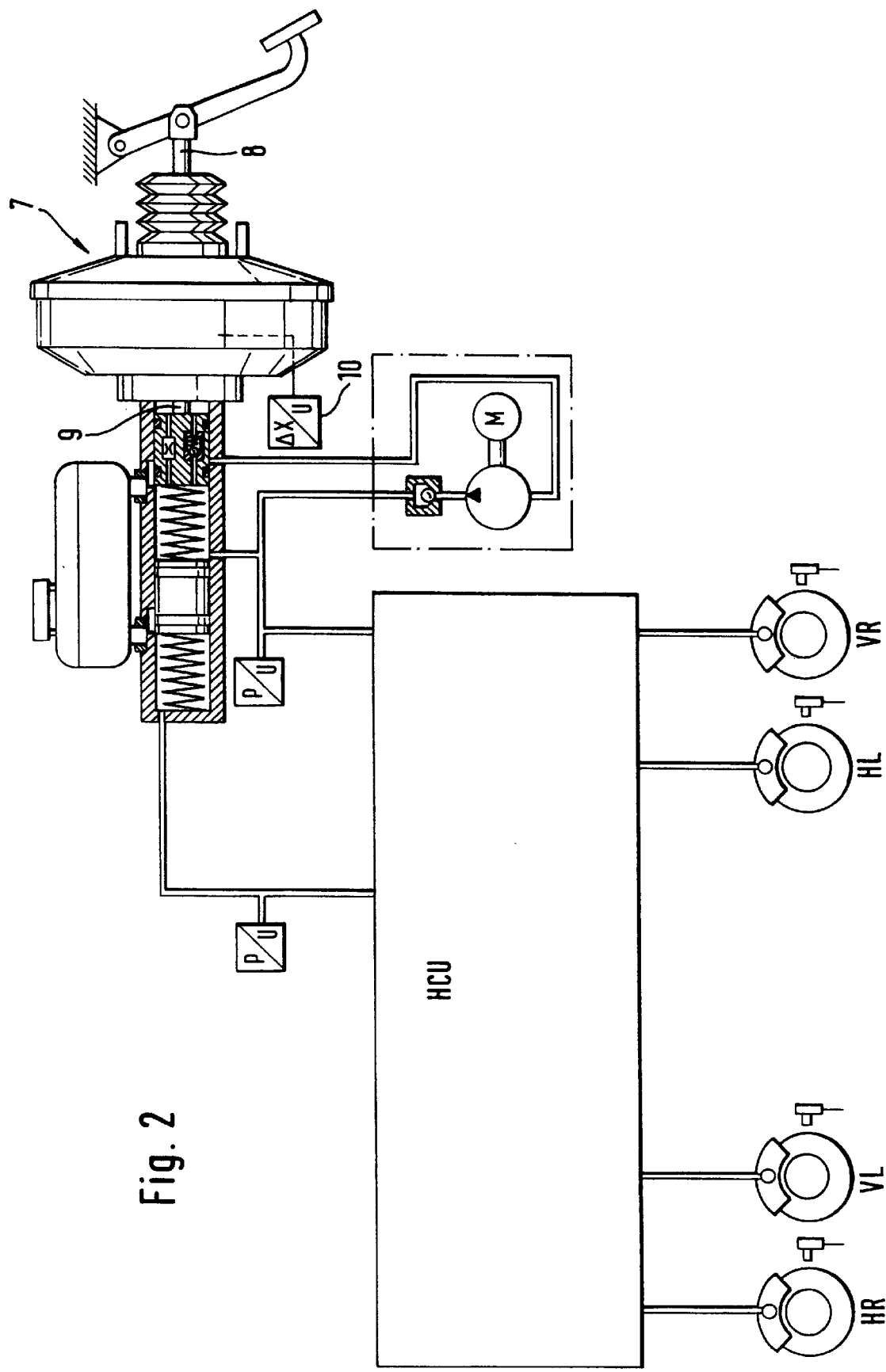
FIG. 2 is a strongly schematized brake system including a pneumatic braking force boosting device with a travel-responsive sensing system, sensing the point of maximum boosting, in accordance with this invention.

In another solution in accordance with FIG. 2, means 10 detects a distance between valve piston and control housing. This arrangement is chosen so as to have means 10 emit a signal reporting the point of maximum boosting 4 if there is a displacement (distance) between a control housing and a valve piston which corresponds to the point of maximum boosting 4. Adjustment of the arrangement is particularly easy to be achieved, the valve piston abutting on a stop provided within the control housing when the point of maximum boosting 4 is reached. In this condition, there is no distance between valve piston and control housing, which fact is detected by means 10. Consequently, means 10 emits a signal reporting the point of maximum boosting 4.

The use of a switch, in particular a switch of the micro-construction type, is indicated as means 10 because of the extremely small space needed and because of the fact that such switches, as standard components, are mass-produced at very low cost. However, it would likewise be possible to use sensors, in particular Hall sensors, if the signal is to be more precise.

The signal thus obtained can be used for connecting up an additional boosting energy source, e.g., by making use of a motor-driven hydraulic pump as it is found in ABS brake systems or in steering boost systems. In this arrangement, a circuit is preferably closed or opened by the signal and thus a change-over element such as a solenoid valve is actuated on its part. Alternatively or additionally, it may be provided to apply the motor of the auxiliary energy source with this signal, i.e., to turn the motor on and off, respectively, or even to control the generated pressure so as to influence the booster characteristic line 1, preferably, as far as its gradient is concerned. The advantage of this arrangement is that the driver is able to apply a finer dosage of the additionally generated braking force. The connecting-up of the auxiliary energy source, e.g., results in the dotted-line branch 6 of characteristic line 1 of FIG. 1. The gradient of said branch 6, of course, can be varied within the scope of the above-mentioned control of the additional boosting energy source for the purpose of making adjustments to any needs of comfort or safety.

Figure 3:
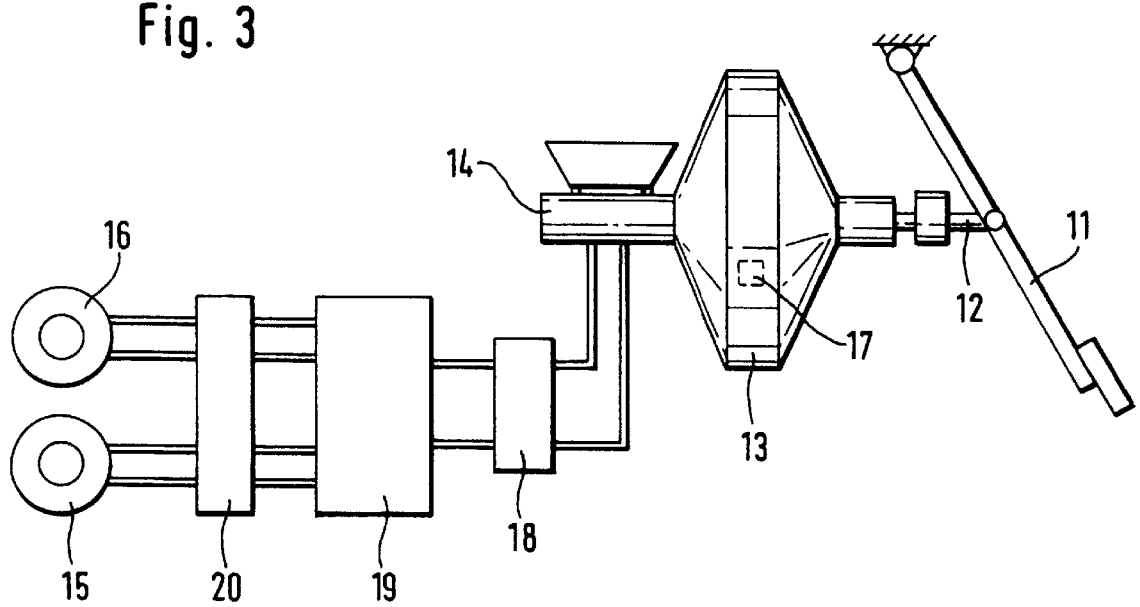
FIG. 3 is a schematized connection diagram of another inventive solution with a pressure-sensitive system for identifying the point of maximum boosting.

FIG. 3 shows a schematic connection diagram of a solution including a plurality of pressure sensors as well as a pedal force sensor on the input member 12. The advantage of this arrangement is that, above the point of maximum boosting 4 of the pneumatic brake booster, the booster characteristic line 1 is variable in a controlled manner. A fundamentally known pedal arrangement 11, together with an input member 12, acts on a pneumatic brake booster 13. Brake booster 13, on its part, together with an output member, acts on a master brake cylinder 14. Hydraulic lines serve the communication between master brake cylinder 14 and a valve block 19 (HCU) which, on its part hydraulically communicates with the wheel brakes 15, 16. First pressure sensors 17 serve to determine the working chamber pressure in the brake booster or to detect the pressure difference/pressure gradient variation in the working chamber. Second sensors 18 serve to determine the hydraulic pressure directly downstream of the master brake cylinder, yet still upstream of the valve block 19. Third sensors 20 are used for determining the hydraulic pressure on the wheel brakes 15, 16.

As is evident, any required evaluation circuitry and the electronic subassemblies for handling and processing the sensor signals are not shown in the drawing for the sake of clarity. Control of the additionally applied braking pressure takes place by comparing a signal representing the nominal pressure (the intention of the driver), e.g., the pressure in master brake cylinder 14, with the pressure on the wheel brakes which has been determined via the third sensors 20. Varying the described procedure, it is conceivable to use the force measured directly on the input member by means of the force sensor visible in the Figure, without leaving the fundamental idea of this invention.

It is understood that the required computing operations are of course carried out in appropriately provided data processing units wherein the necessary computation algorithms have been implemented.

What is claimed is:

1. A braking force boosting device, comprising:
   an actuatable input member,
   an output member for applying a master brake cylinder,
   a control valve, actuatable by a valve piston and arranged in a control housing, for controlling the boosting energy generated as a result of a pressure difference between a chamber of variable pressure and a vacuum chamber,
   a boost sensor for sensing a point of maximum boost generated by the braking force boosting device, wherein said boost sensor generates a signal proportional to boost force, wherein said boost sensor senses a pressure difference between the chamber of variable pressure and the ambient pressure and further determines a change of the time derivative of the pressure in the chamber of variable pressure and wherein the boost sensor generates a signal reporting the point of maximum boosting whenever the pressure difference and the derivative of the pressure difference approaches zero.

2. A braking force boosting device as claimed in claim 1, wherein said boost sensor senses a pressure difference between the chamber of variable pressure and the ambient pressure or a pressure gradient change in the chamber of variable pressure and wherein the boost sensor generates a signal indicative of the point of maximum boosting when the pressure difference approaches zero or the pressure gradient approaches zero.

3. A braking force boosting device as claimed in claim 2, wherein said boost sensor includes pressure sensors residing in the area of the control valve and wherein the pressure sensors are used for determining the pressure difference between the pressure in the chamber of variable pressure and the ambient pressure or for determining the pressure gradient in the chamber of variable pressure.

4. A braking force boosting device as claimed in claim 1, wherein said boost sensor detects a relative displacement between valve piston and control housing and emits a signal reporting the point of maximum boosting when there exists a distance corresponding to the point of maximum boosting.

5. A braking force boosting device as claimed in claim 1, wherein said boost sensor includes a switch, wherein said switch emits an electric operating signal when there exists the point of maximum boosting.

6. A braking force boosting device as claimed in claim 1, wherein said boost sensor is a Hall sensor.

* * * * *